March 10, 1970  R. M. FACHINI  3,499,273
COTTON PICKER SPINDLE SLAT BAR STRUCTURE
Filed Dec. 28, 1967  2 Sheets-Sheet 1
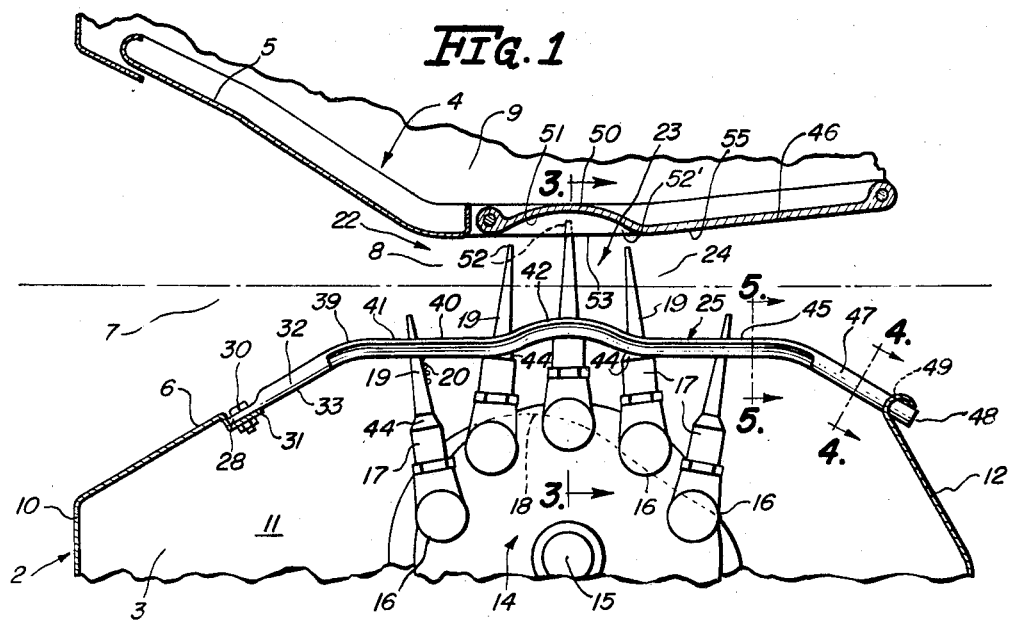
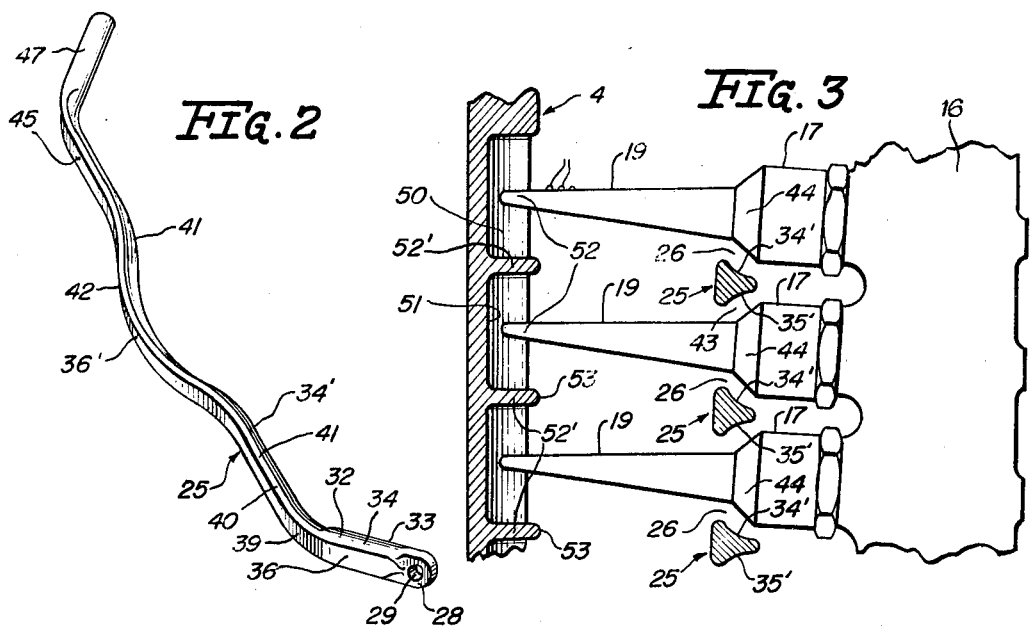
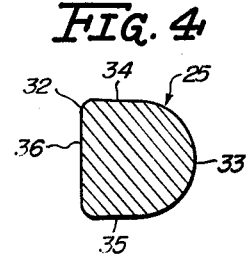
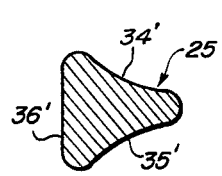
INVENTOR.
Robert M. Fachini
ATTORNEY March 10, 1970   R. M. FACHINI   3,499,273
COTTON PICKER SPINDLE SLAT BAR STRUCTURE
Filed Dec. 28, 1967   2 Sheets-Sheet 2
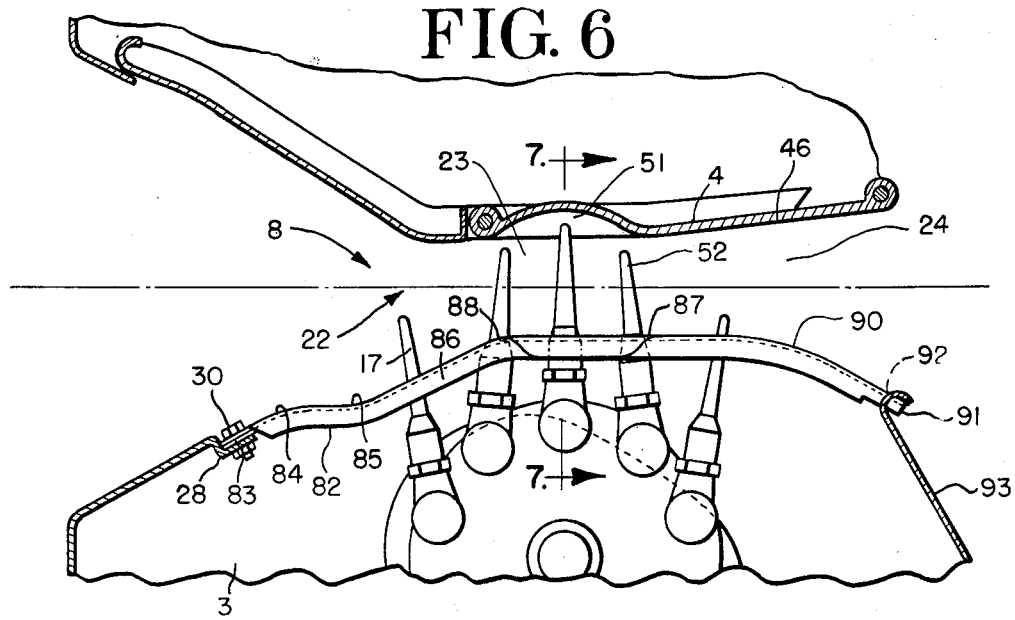
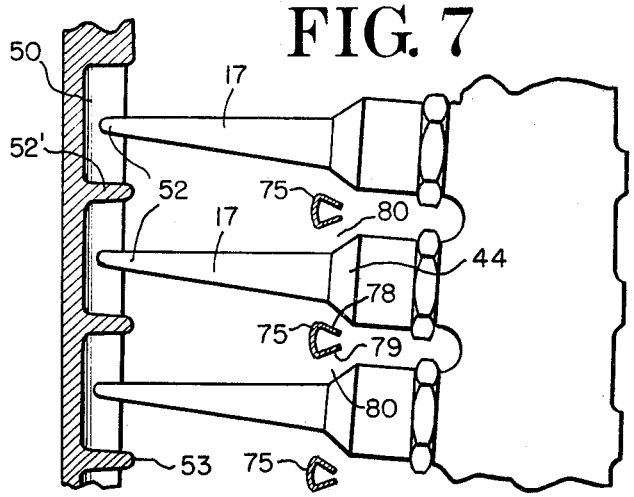
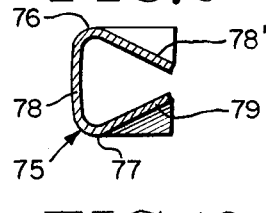
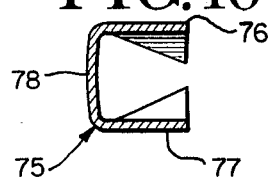
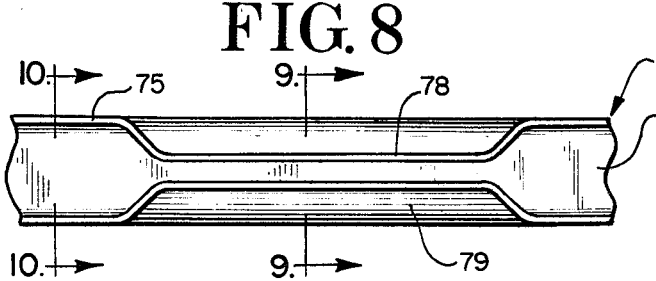
INVENTOR.
Robert M. Fachini
BY John J. Konarik
Attorney

United States Patent Office 3,499,273
Patented Mar. 10, 1970

3,499,273
COTTON PICKER SPINDLE SLAT BAR STRUCTURE
Robert M. Fachini, Memphis, Tenn., assignor to International Harvester Company, Chicago, Ill., a corporation of Delaware
Continuation-in-part of application Ser. No. 169,219, Jan. 29, 1962. This application Dec. 28, 1967, Ser. No. 701,518
Int. Cl. A01d 45/18
U.S. Cl. 56—44
10 Claims

ABSTRACT OF THE DISCLOSURE

A cotton picker having a plant passage defined at one side by a compressor sheet and at the other side by a slatted wall comprising slat bars which have frontal areas dipped toward the picker rotor to permit early initial projection of its sprindles into the passage and having intermediate their ends portions contoured to permit maximum extension of the spindles into the passage and in one embodiment having at the juncture of these portions a plant parting projection into the passage to separate the branches of the plant to permit the spindles better access to the lint cotton.

---

This application is a continuation-in-part of my application Ser. No. 169,219 filed Jan. 29, 1962, and now abandoned for Cotton Picker Spindle Slat Bar Structure.

This invention relates to cotton pickers of the type which comprise a harvesting mechanism having a plant passage into which are sequentially projected cotton picker spindles from a side of the passage for penetrating the cotton plants and entwining the seed cotton on the spindles and withdrawing the cotton from the plant pursuant to retraction of the spindles into the harvester housing.

In cotton pickers of current construction the throat or plant passage normally has been provided with substantially or essentially flat sides on the theory that it is necessary to provide an unobstructed passage for the cotton plants through the passage or tunnel to prevent green bolls from breaking off. I have observed, that because of such construction the cotton picker spindles, which orbit in a somewhat elliptical path, dwell in the plant a relatively short time because of the construction of the slat bars through which the spindles emerge from the harvester housing into the plant passage and between which they withdraw from the plant passage into the harvester housing.

In order to obtain increased picking action it is necessary as evidenced by my own field trials, to prolong the dwell time of the cotton picker spindle within the plant to insure that the spindle snags the cotton and has sufficient time to entwine the cotton on the spindle before withdrawal. It is further necessary to project the maximum amount of the spindle into the plant for the longest period of time.

It is a primary object of this invention to provide a slat bar construction of novel contour such as will not strip the unripened cotton bolls from the plant and at the same time prolong the dwell time of the spindles within the plant.

A further object of the invention is to provide a novel slat bar so interrelated with the orbit of the cotton picker spindles as will insure proper penetration of the plant by the spindles and withdrawal of the spindles from the plant without breaking off the unripened bolls.

A further object of the invention is to provide a novel slat bar which has good transverse rigidity and which has a relatively broad plant opposing surface and which has top and bottom sides converging toward the picker rotor to develop V-shaped spaces therebetween to accommodate movement of the spindle holders and the conical shields within the V-shaped spaces and thus obtain maximum projection of the spindles into the plant passage.

A further object is to provide a novel slat bar construction for a cotton picker which has a leading end portion of a broad or gentle curvature which leads into an intermediate portion of more abrupt curvature whereby the plants are gently guided from the leading to the intermediate portion, the slat bar having a trailing portion of a gently receding curvature to permit the plants to move unobstructively past the picking zone.

These and other objects and advantages inherent in and encompassed by the invention will become more readily apparent to those skilled in the art from the following description and drawings wherein:

FIG. 1 is a fragmentary horizontal sectional view of a cotton picker incorporating the invention;

FIG. 2 is a perspective view of one of the slat bars;

FIG. 3 is an enlarged transverse vertical sectional view taken substantially on line 3—3 of FIG. 1;

FIG. 4 is an enlarged sectional view taken substantially on the line 4—4 of FIG. 1;

FIG. 5 is an enlarged view taken substantially on the line 5—5 of FIG. 1;

FIGURES 6–10 illustrate a second embodiment of the invention;

FIG. 6 being a horizontal section comparable to FIG. 1 showing a modified form of slat bar;

FIG. 7 being an enlarged sectional view taken essentially on line 7—7 of FIG. 6;

FIG. 8 being an enlarged transverse vertical sectional view of a portion of the slat bar at the picking zone;

FIG. 9 being a sectional view taken substantially on line 9—9 of FIGURE 8; and

FIG. 10 being a sectional view taken substantially on line 10—10 of FIGURE 9.

Describing the invention in detail and having particular reference to the drawings, there is shown a cotton picker generally designated 2 which comprises a housing portion 3 and a laterally opposing compressor structure 4. The compressor structure has a forward guide or crowder section 5 which diverges forwardly with respect to an opposing side portion 6 of the housing 3 and forms an entryway 7 therewith leading into the plant passage or tunnel 8. It will be understood that the compressor structure 4 is carried from framework 9 as is conventional practice as well known to those skilled in the art and that the housing 3 in addition to the side portion 6 has an upright front wall 10, bottom wall 11, and a rear post structure 12. The housing itself may be of typical construction. The housing 3 encloses a picker rotor generally designated 14 which revolves about a vertical axis 15 and peripherally carries picker bars 16 each of which mounts a plurality of vertically spaced cotton picker spindle assemblies 17 which orbit in a defined path as controlled by the typical cam means 18 as well known to those skilled in the art. The spindles 19 of the assemblies 17 revolve about their individual axes and are provided with barbs 20 of any convenient construction for snagging cotton from the plant and entwining it about the spindle 19. The spindles 19 emerge from the housing 3 adjacent to the leading end 22 of the plant throat 8 and advance to a maximum depth into the intermediate zone 23 of the plant throat and at the trailing end 24 of the plant throat the spindles withdraw from the plants and recede into the housing 3. The plant passage 8 is defined by slat bars generally designated 25, these slat bars being vertically spaced and intercalated with the rows of spindle assemblies 17 and define slots 26 therebetween through which extend the spindles proper 19. This permits maximum extent of the spindles in their entry into the plant passage 8.

As best seen in FIG. 1, the forward end of each slat 25 has a flattened portion 28 which is apertured at 29 through which is passed a bolt 30 secured to a flange 31 at the trailing end of the housing vertical side wall portion 6. The forward portion of the slat bar indicated 32 is somewhat semi-cylindrical in cross-section and presents an arcuate rear surface 33 and substantially horizontal flat top and bottom surfaces 34 and 35 which extend to the outer side of the bar and merge into a substantially flat vertical surface 36. It will be seen that the portion 32 merges into the leading end portion of the intermediate portion 41 and develops an initial crest or convexity 39 which sweeps the plant laterally into the leading end 22 of the plant passage. The rear end portion 40 of the front portion of the intermediate part 41 angles laterally toward the rotor and then at its trailing end merges into a central intermediate portion 42 which convexes outwardly in close proximity to the path of movement of the root end portions of the spindles 19. It will be apparent that the central intermediate portion 42 is somewhat triangular in cross section and comprises a vertical surface 36′ which is a continuation of the surface 36 and top and bottom inwardly converging concave surfaces 34′, 35′. It will be observed from a consideration of FIG. 3, that the surfaces 34′, 35′ of adjacent slat bars 25, 25 develop generally V-shaped spaces 43 which accommodates passage of the shield portions 44 of each spindle assembly 17.

The curvature of the intermediate portion 42 approximates and is substantially concentric with the orbital path of the spindles and at its rear extremity flattens out into a somewhat straight section or length 45 which diverges rearwardly with respect to the opposing portion 46 of the compressor assembly. The rear end of the portion 45 merges into a rearwardly and outwardly inclined rear end portion 47 which has a cross sectional configuration identical with that of the forward portion 32, the distal end portion 48 of the portion 47 extending through an opening 49 in a rear post structure 12. It will be seen that the portion of the compressor structure opposite the bulged portions 42 of the slat structure is concaved as at 50 to provide a pocket 51 admitting the outer end portions 52 of the spindles 19. The plants are prevented from crowding into the pocket 51 by a series of generally horizontal ribs 52′ which have their free edges 53 substantially in alignment with the surface 55 of the portion 46 of the compressor sheet structure. The instant construction in providing a pocket for the outer ends of the picker spindles in the picking zone of the plant throat or passage assures adequate penetration of the plant by the picker spindle and in addition the novel contouring of the slat bars increases the dwell time of the picker spindles within the plant.

It will be seen that the novel form of the slat bars in effect widens the normal plant passage and the form of the slat bars permits the spindles to project a maximum distance outwardly and to maintain such maximum projection for a considerable period of time before withdrawing into the picker housing.

Referring now to the embodiment of the invention shown in FIGURES 6 through 10 wherein parts identical to those of the previous embodiment are identified with the same reference numerals, it will be noted that the slat bars 75, 75 in this embodiment are channel shaped in cross section and each comprises a top wall or flange 76, a bottom wall 77 and a front wall or web 78 which opposes the plant passage 8. The top and bottom walls 76, 77 are generally horizontal except in the picking zone 23 that is intermediate the ends of the slat bar. Each of these walls is offset toward the center of the bar that is the top wall portion 76 has a downwardly sloping portion 78′ and the lower wall 77 has an upwardly sloping portion 79. Thus, these wall portions 78′, 79 develops V-shaped spaces at 80 which are similar to the spaces 43 which accommodate the root end portions and shields 44 of the respective spindle assemblies 17. A maximum penetration of the spindles is obtained in this area which have their free ends extending into the pocket 51 of the compressor sheet structure 4. In the instant construction each slat bar has a leading portion 82 which at its forward end is provided with a flat lug 83 which is bolted by means of the bolts 30 to the housing portion 28. The slat bar then continues from the lug 83 in a curved section 84 which is convexed toward the passage 8. The section 84 merges into a concave portion 85 in the region of the emergence of the spindles 17 whereby the spindles enter into the plant as soon as possible. Thereafter the concave section 84 continues as a substantially flat portion 86 which progresses diagonally rearwardly toward passage 8 and is generally tangential to the path of travel or the orbit of the spindles. This portion 86 then continues into a flat portion 87 which opposes the pocket portion 51. The juncture between the portions 86 and 87 provides a corner 88 which functions somewhat as a wedge entering between the stalks and the branches of the plants and therefore tends to effect some separation of the branches and provides accessibility for the spindles to the lint and thereby enhances their picking capabilities. Providing a flat portion 86 adjacent to the spindle does not disturb the plants in the region of the picking zone where the spindles penetrate their utmost extent into the plant. There is no working or whipping of the plant or branches which would dislodge cotton from the plant and allow it to fall to the ground after the plant exits from the plant tunnel. The flat portion continues well beyond the concavity 51 to the area of exit of the spindles as well as seen in FIGURE 6 and then the trailing end 90 of each slat curves away from the plant tunnel and diverges with the opposing rear portion 46 of the compressor sheet whereby the plant is accommodated expansion while it exits from that portion of the plant passage.

The rear end 91 of the trailing portions 90 are hooked into series of vertically arranged slots 92 in a rear post structure 93 which forms part of the rear wall structure of the cotton picker drum 3.

Having described preferred forms of the invention, it will be readily understood that other embodiments will become readily apparent to those skilled in the art.

What is claimed is:

1. A cotton harvester comprising a housing having a plant passage having a forward end, a picking zone and exit end and defined at one side by a compressor structure and at the other side by a plurality of horizontally positioned slat bars, a picker rotor within the housing having a plurality of spindles adapted to enter into the plant passage at said forward end, move through the picking zone and retract from the passage at said exit end, each spindle being tapered toward a free end, an enlarged shield and support structure at the inner end of each spindle tapering toward said free end of the spindle, each slat bar having a leading portion at said forward end of the passage, an intermediate portion at the picking zone, and a trailing portion at the exit end, each slat bar having a top and bottom area on said intermediate portion at said picking zone converging toward the rotor and providing a tapered space such as to accommodate said shield and spindle support structure therein so that the entire length of the picking portion of the spindle extends through the slat bars at said picking zone for maximum picking efficiency.

2. The invention according to claim 1 and each slat bar being of solid section and said top and bottom areas at said picking zone being concave.

3. The invention according to claim 1 and each slat bar being of channel section and having top and bottom webs, said webs being generally horizontally disposed before and behind the picking zone and converging in a direction away from the plant passage at said picking zone.

4. The invention according to claim 1 and said compressor structure comprising a pocket disposed at said picking zone, and said spindles projecting with their free ends into said pockets.

5. The invention according to claim 1 and each slat bar having a generally flat section extending from said curved leading portion to said picking zone.

6. The invention according to claim 1 and each slat bar at said intermediate portion being flat and said leading portion merging into the leading end of said intermediate portion and developing a plant parting corner therewith.

7. The invention according to claim 6, and each said slat bar being channel shaped and having top and bottom flanges and an intervening front web proximate the plant passage.

8. The invention according to claim 7 and said top and bottom flanges being deformed toward each other only in the intermediate portion.

9. The invention according to claim 1 and each slat bar having plant parting means adjacent to the intermediate portion thereof.

10. The invention according to claim 1 and each slat bar presenting on said intermediate portion a substantially flat surface to said passage extending generally tangentially to the axis of orbit of the rotor.

References Cited

UNITED STATES PATENTS

| | | | |
|---|---|---|---|
| 1,500,992 | 7/1924 | Irwin | 56—14 |
| 2,333,965 | 11/1943 | Weems | 56—44 |
| 2,576,567 | 11/1951 | Brown | 56—44 |
| 2,635,409 | 4/1953 | Thomann | 56—44 |
| 2,650,462 | 9/1953 | Skaggs | 56—14 |
| 2,676,449 | 4/1954 | Smith | 56—41 |
| 2,774,208 | 12/1956 | Putnam | 56—48 |
| 2,876,612 | 3/1959 | Walker et al. | 56—50 |
| 3,040,506 | 6/1962 | Lindsay | 56—43 |
| 3,336,736 | 8/1967 | Ramsey | 56—47 |
| 3,387,439 | 6/1968 | Tracy | 56—50 |

RUSSELL R. KINSEY, Primary Examiner